June 28, 1966   K. G. ÅHLÉN   3,258,093
HYDROSTATIC CLUTCH
Filed March 6, 1961   6 Sheets-Sheet 3
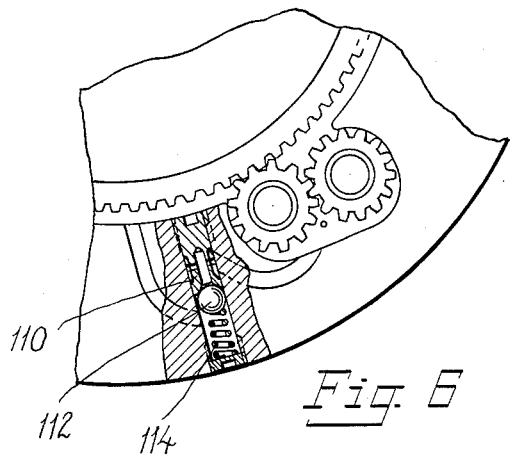
Fig. 7
Fig. 9
Fig. 6
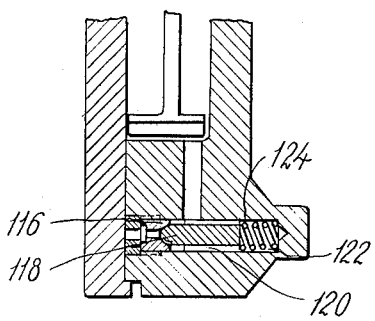
Fig. 8
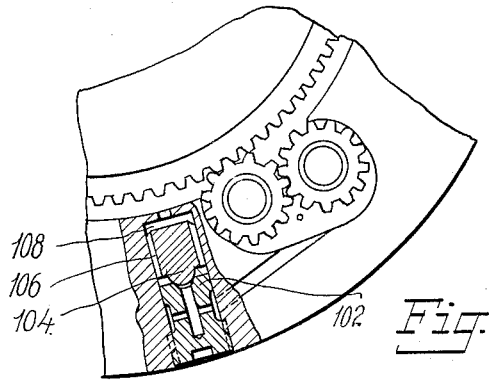
Fig. 4
Fig. 3
Fig. 5
INVENTOR.
BY June 28, 1966     K. G. ÅHLÉN     3,258,093
HYDROSTATIC CLUTCH Filed March 6, 1961            6 Sheets-Sheet 4

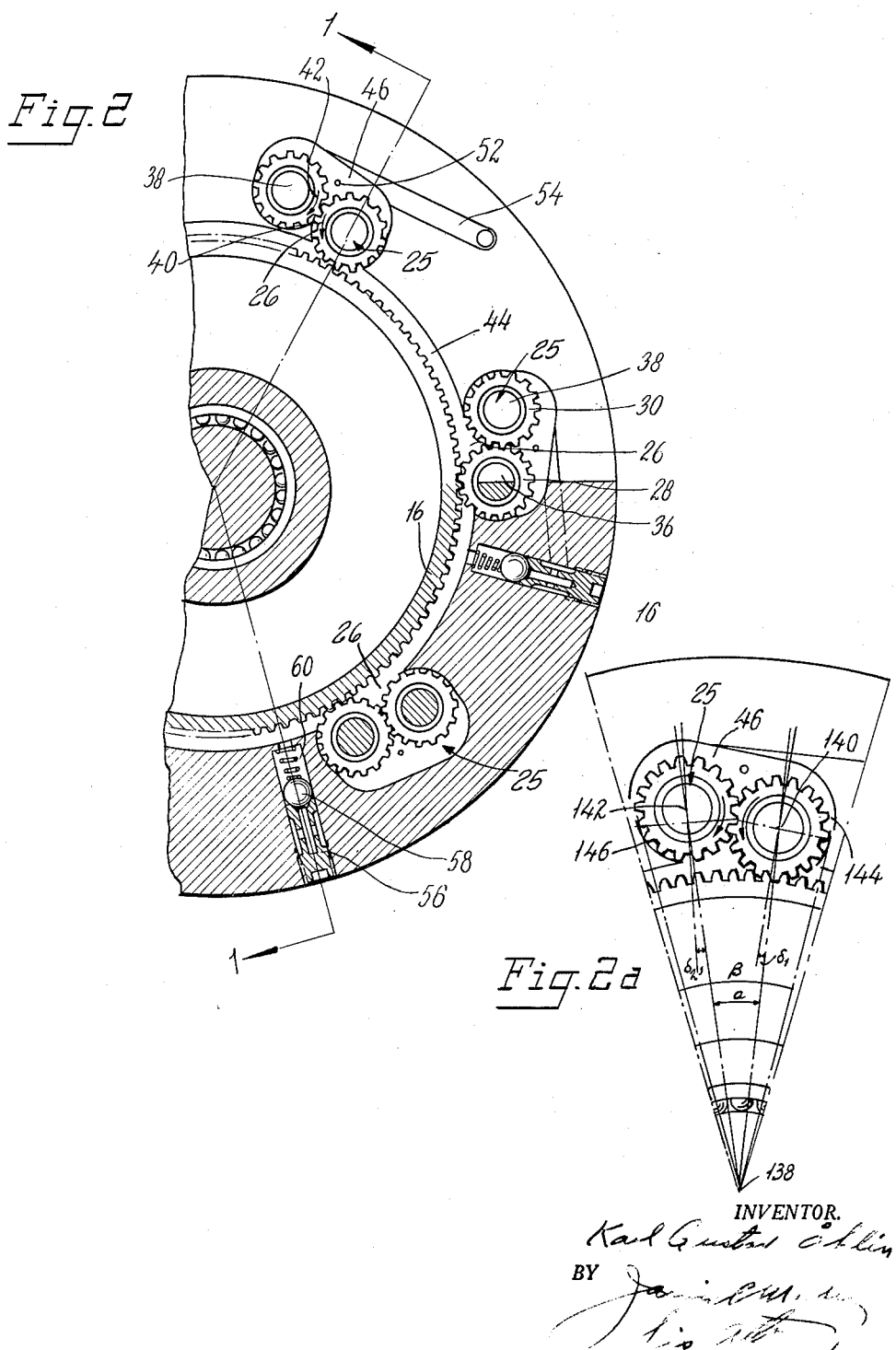

INVENTOR.

BY

June 28, 1966   K. G. ÅHLÉN   3,258,093
HYDROSTATIC CLUTCH
Filed March 6, 1961   6 Sheets-Sheet 5
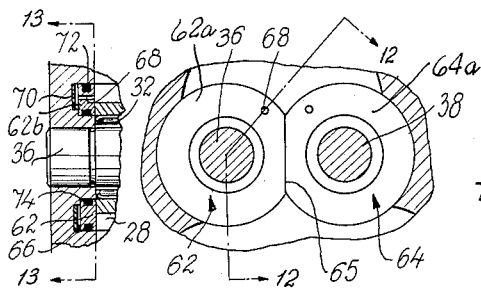
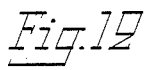
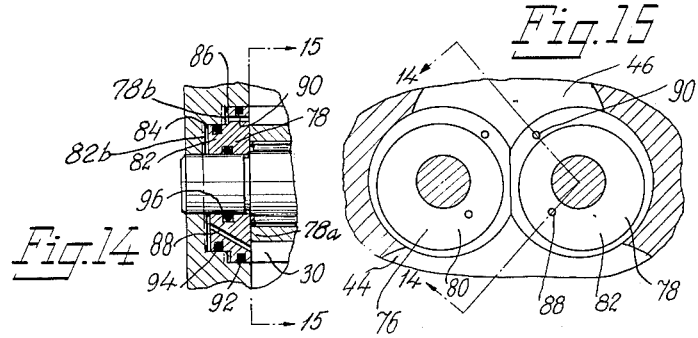
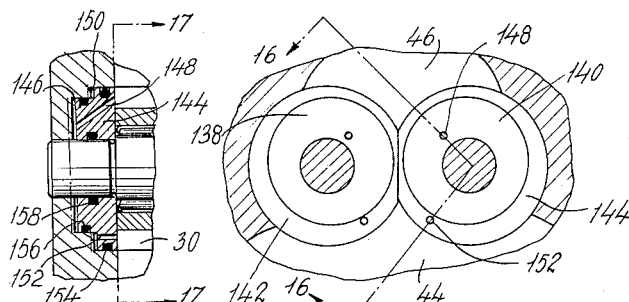
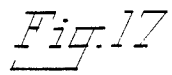
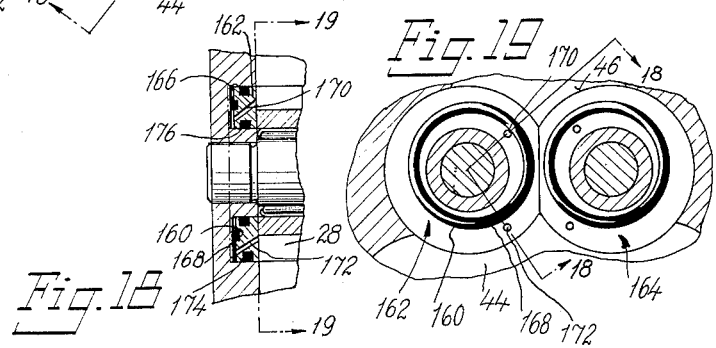
INVENTOR.

3,258,093
HYDROSTATIC CLUTCH

Karl Gustav Åhlen, Stockholm, Sweden, assignor, by mesne assignments, to S.R.M. Hydromekanik Aktiebolag, Stockholm, Sweden, a joint-stock company of Sweden Filed Mar. 6, 1961, Ser. No. 93,671
27 Claims. (Cl. 192—61)

This application is a continuation in part with respect to my copending application Serial No. 688,002, filed October 3, 1957 (now abandoned), and relates back thereto as to all dates and rights incident to the filing thereof.

The present invention relates to hydrostatic couplings of the gear pump type and has particular reference to such couplings adapted for use in transmitting power at relatively high rotative speeds as well as at low speeds.

Heretofore couplings of the type under consideration have usually been used only in relatively low speed applications, such for example as in the drive to propeller shafts for relatively large ships, which have maximum speeds of less than a hundred, or at most only a few hundred r.p.m. In such application the principal value of such couplings is for damping torsional vibrations and the designs have been such that the couplings would be wholly impractical for power transmission at high shaft speeds, owing to excessive slip and also unacceptably high stresses that would result from the centrifugal forces generated by operation at high rotative speeds.

Relatively recent developments in the field of heavy duty highspeed power plants for both vehicle and marine drives, particularly in the Diesel engine field, have made many of the inherent features of the gear type hydrostatic coupling highly advantageous in high speed drives both for small and relatively large values of power transmission, and accordingly it is a general object of the present invention to provide a coupling of that type of improved form which is capable of practical operation at relatively high rotative speeds at high efficiency and without the generation of excessive stresses, which is relatively small, light in weight, simple, capable of mass production manufacture at relatively low costs and which makes available in the fields of high speed power transmission the inherent advantages of that particular type of coupling heretofore obtainable only in low speed drives.

Further general objects contemplate the provision of improved coupling structure by means of which the coupling may readily be utilized as a torque limiting device and also, by virtue of particular arrangements of certain parts, as a device providing predetermined desired torque transmitting characteristics relative to variations in speed of operation.

Still further objects contemplate the provision of improved construction by virtue of which a highly efficient coupling with minimum slip can be manufactured with the use of practical tolerance limits of a nature such that a reasonable cost is possible and the further provision of a construction which substantially eliminates distortion due to heat generated by certain normal operating conditions, so that the original tolerances, and the efficiency governed thereby, are substantially maintained under all operating conditions.

Still further objects contemplate the provision of a readily reversible coupling and also a coupling in which the close tolerances required to be established in order to reduce slip to an acceptable minimum, are maintained when the coupling is in service and subject to expansion and contraction with consequent possible distortion of the main housing as a result of heat generated by the coupling under certain of the normal conditions of operation thereof.

Other and more detailed objects of the invention will become apparent as the ensuing portions of this specification proceeds.

In order to effect its several objects, the invention contemplates in general the provision of a coupling structure comprising a rotatably mounted central gear, a rotatably mounted housing coaxial therewith and providing a main chamber for working fluid, and a plurality of gear pumps carried by the housing in peripherally spaced relation to rotate therewith, each of the pumps comprising a pump chamber having a pair of pump gears mounted to rotate about their own axes therein, with one of the gears of each pair driven from the central gear.

At high speeds, the effect of the centrifugal force increases rapidly, which particularly causes difficulties in mounting the pump gears and in the sealing between these gears as well as between these gears and the walls of the pump chamber.

In order to overcome these difficulties the pump gears in accordance with the present invention are disposed in peripherally intermeshing relation and the peripheral wall of each of the pump chambers comprises two peripherally spaced sealing sections in effective sealing proximity to the peripheries of the respective gears of the pump and an intermediate section connecting the sealing sections. The intermediate section is spaced radially outwardly from the peripheries of said pump gears sufficiently to provide a pressure chamber located radially outwardly of the pump gears, which pressure chamber extends peripherally over an angle at least as great as that included between two radii extending from the axis of rotation of the housing and passing through the respective axes of rotation of the pump gears. The hydraulic pressure acting on each pump gear will in this way produce a resultant force which is approximately in the direction opposite to that of the centrifugal force acting on the gear.

In a preferred embodiment of the invention the central gear is located in the main chamber and in engagement with one of the pump gears of each pump. The pump chambers are in that embodiment located radially outside the central gear.

The two pump gears of each pump are either of the same or about the same diameter and arranged at different radial distances from the axis of rotation of the housing, the difference in radial distance being the same or about the same as the depth of the teeth, or arranged at equal radial distances from the axis mentioned above and of different diameters, the difference in the radii of the gears being the same or about the same as the depth of the teeth. With such arrangements the influence of the centrifugal force will be approximately the same on the two gears and thereby also the influence of the centrifugal force on the bearing forces, the latter depending on the difference between the centrifugal force and the resultant of the hydraulic pressure.

A considerable part of the leakage in a gear pump arises between the plane sides of the gears and the axial end walls of the pump chamber. In a preferred embodiment of the invention at least one of the end walls of each pump chamber for this reason comprises two separate end plates movable relative to each other and each being movable axially relative to one of the pump gears and having a front surface facing one gear in effective sealing proximity thereto. These end plates are enclosed in recess in the end wall of the pump chamber in such a way that the peripheries of the end plates are in effective sealing proximity to the peripheral walls of the recess and to each other in order to avoid leakage along the peripheries of the plates. The plates are forced in axial direction against the gears either by springs or by pressure fluid from the pressure chamber of the pump acting on at least a part of the back surface of the plate.

In order to decrease the stresses in the walls of each pump chamber owing to temperature differences, the stresses in the housing of the coupling etc. it is preferred to build up the coupling from a housing providing the main chamber and several different gear pump units, each comprising a casing fixed to the housing of the coupling and enclosing a pump chamber having a pair of pump gears mounted to rotate about their own axes therein in intermeshing relation to each other with one of the gears driven from the central gear. These pump casings may each be provided with two shoulders in peripherally spaced relation, each resting against the peripheral wall of the main chamber. It is desirable to fix each such casing to the housing of the coupling by a single rigid joint in order to prevent the transmission of stresses derived from the housing to the separate casings.

This system of building up the coupling from separate gear pump units is also advantageous from the standpoint of manufacture.

A hydrostatic coupling of the present type is further very suitable for use as a maximum torque coupling limiting the transmission torque to a certain value that cannot be exceeded, which as previously noted is one of the several objects of the invention. For that reason the invention contemplates the provision of a coupling with a circulation duct from each pressure chamber of the gear pumps to the main chamber provided with a non-return valve for flow of fluid only from the pressure chamber to the main chamber. The value of the maximum torque can be varied by adjustment of the valves, especially the strength of the springs pressing the valve bodies against their seats.

Different torque transmitting characteristics of the coupling in relation to its speed of operation may be obtained by making and locating the valves in different ways. If the valve body is placed in such a way that it moves radially outwardly toward its seat to close the forces of the valve spring and the centrifugal force are added together, resulting in a coupling which is able to transmit greater torque at high speeds than at low speeds, which may be a particular advantage if the driving arrangement including the coupling has a low critical speed that has to be passed through during drive. Sometimes the valve spring may be altogether dispensed with in this arrangement, so that the valve is controlled by means of the centrifugal force only.

If on the other hand the valve body is moved radially inwardly toward its seat to close, the centrifugal force will be subtracted from the force of the valve spring whereby a coupling is obtained which is capable of transmitting greater torque at low speeds than at high speeds, with the result that the transmitted power can be maintained approximately constant irrespective of the actual speed.

By varying the strength of the valve spring and the mass of the valve body, the coupling characteristic may be adjusted to the desired nature.

If, however, the maximum transmissible torque is to be maintained constant, the valve body should be movable only parallel with the axis of the shaft whereby the effect of the centrifugal force on the body is neutralized.

In order to make the vibration damping action of the hydrostatic coupling as effective as possible it is desirable to determine the number of the teeth of the central gear so that it is different from any multiple of the number of the gear pumps. By this expedient, synchronous meshing of the central gear with the teeth of the driving gears of the several pumps with which it is in mesh is avoided. As the pressure of each pump varies approximately along a sine curve, such synchronous meshing would result in the pressure of all the pumps having maximum value at the same time and the torque transmitted through the coupling would consequently vary periodically. In order to avoid such variation in the torque it is preferable to have double the number of the teeth of the central gear coincide with an odd multiple of the number of the gear pumps.

In order to make operation in both directions possible by means of the hydrostatic coupling, certain gear pumps are further provided for pumping fluid to their pressure chambers in one direction of rotation of the housing relative to that of the central coupling, and other gear pumps are arranged to supply fluid to their pressure chambers in a direction of rotation opposite that of the housing relative to that of the central gear.

In order to simplify the bearing and sealing problems it is furthermore advantageous to fix the pump wheel shafts in the housing and to mount the pump wheels rotationally on their shafts, preferably by means of needle bearings.

Some suitable embodiments of the invention are shown on the accompanying drawings, in which:

FIG. 2 shows a cross-section through the same embodiment of the invention taken along the line 2—2 in FIG. 1.

FIG. 2a is a view on larger scale of part of FIG. 2.

FIG. 3 is a diagram showing the relation between the maximum torque and the speed in the embodiment of FIG. 1.

FIG. 4 shows an alternative embodiment of a detail in FIG. 2.

FIG. 5 is a diagram showing the relation between the maximum torque and the speed in the embodiment of FIG. 4.

FIG. 6 shows a second alternative embodiment of the same detail as in FIG. 4.

FIG. 7 is a diagram showing the relation between the maximum torque and the speed in the embodiment of FIG. 6.

FIG. 8 shows an alternative embodiment of a detail in FIG. 1.

FIG. 9 is a diagram showing the relation between the maximum torque and the speed in the embodiment of FIG. 8.

FIG. 12 is a view on larger scale similar to part of FIG. 1 and taken along the line 12—12 in FIG. 13.

FIG. 13 is a section along the line 13—13 in FIG. 12.

FIG. 14 is an alternative embodiment of the details shown in FIG. 12 taken along the line 14—14 in FIG. 15.

FIG. 15 is a section along the line 15—15 in FIG. 14.

FIG. 16 is another alternative embodiment of the details shown in FIG. 12 taken along the line 16—16 in FIG. 17.

FIG. 17 is a section along the line 17—17 in FIG. 16.

FIG. 18 is a third alternative embodiment of the details shown in FIG. 12 and taken along the line 18—18 in FIG. 19.

FIG. 19 is a section along the line 19—19 in FIG. 18.

FIG. 20 is a longitudinal section through another embodiment of the invention.

FIG. 21 is a cross-section through the same embodiment of the invention along the line 21—21 in FIG. 20.

Figure 1:
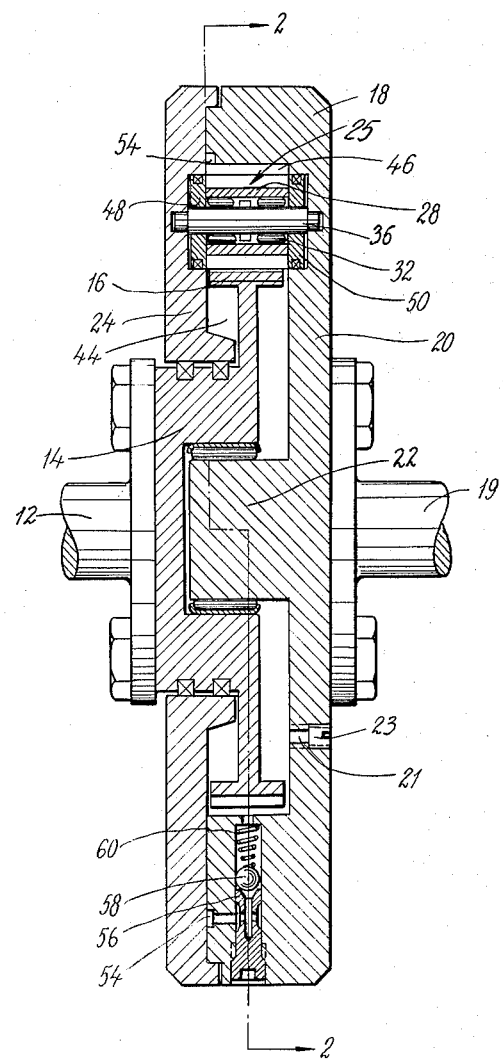
FIG. 1 shows a longitudinal section through an embodiment of the invention taken along the line 1—1 in FIG. 2.

In the coupling shown in FIG. 1 a gear 16 is rigidly connected to one shaft 12. This gear is arranged inside a fluid-filled housing 18, rigidly connected to another shaft 19, one end wall 20 of the housing being designed with a stub shaft 22 on which the hub 14 is mounted and the other end wall 24 of the housing sealing against the hub 14. The end wall 20 of the housing is provided with a filler hole 21 having a plug 23.

In the housing 18 a number of pump chambers 26 are arranged radially outside the gear 16. In each of these chambers a gear pump indicated generally at 25 is formed by two gears 28, 30, mounted by means of needle bearings 32 on fixed shafts 36, 38 carried by the housing. One of these gears, viz., 28 engages gear 16, this latter gear serving as a sun gear, the other gears serving as planet gears and the housing serving as a planetary gear carrier.

In the embodiment shown, the two gears 28, 30 of each pump 25, are of equal diameter and arranged at different radial distances from the axis 138 of rotation of the coupling, the difference being the same as the depth of the gear teeth. These gears rotate in the direction of the arrows 40, 42 and pump fluid from the main chamber 44 of the housing 18 to the portion of the pump chamber 26 lying radially outside the gears 28, 30.

As shown in FIG. 2a each pump chamber has peripheral walls comprised of cylindrical areas adjacent to said main chamber and sealing against the pump gears 28, 30 to points 144 and 146, respectively, and an intervening area forming the wall of the pressure chamber 46 formed by the aforesaid portion of the pump chamber and located radially outside said gears. Said pressure chamber extends over an angle $\beta$ having its apex at the axis 138 and with its sides drawn through said points 144 and 146. Said angle $\beta$ is greater than and shown to be of about twice the size of an angle $\alpha$ having its apex at the axis 138 and with its sides drawn through the axes 140 and 142, respectively, of the pump gears 28, 30. Owing to the great peripheral extent of the pressure chamber 46, the resultant force of the differential fluid pressure acting on each of the pump gears 28, 30 is directed toward the axis 138 in the direction of the radii extending from the axes 140, 142 of the planetary gears 28, 30, respectively, through axis 138. Because of the substantial coincidence of said resultant force and said radii, said resultant force will act in directions substantially counter to the direction of the centrifugal forces generated, so that the latter force will be balanced to a large extent, which makes possible the use of speeds at a higher number of revolutions per unit time than in any earlier known form of hydrostatic coupling.

On both axial sides of each pump pressure plates 48, 50 for sealing are arranged, which plates are movable in axial direction relative to the casing 18 and of which the inner or gear faces 48a and 50a (FIG. 11) confronting the gears are pressed against the gears 28, 30 by pressure fluid through a channel 52 from the pressure chamber 46 to the outer or motive faces 48b and 50b (FIG. 11) of the plates.

Between the pressure chamber 46 and the main chamber 44 a circulation duct 54 is arranged provided with a valve consisting of a radially adjustable valve seat 56, a valve body 58 and a spring 60, pressing the valve body radially outwardly to contact the valve seat.

In order to adjust the pressure of the springs against the valve bodies, each valve seat is axially displaceable by means of a thread. By this displacement of the valve seats, the overload torque can be adjusted and, by the individual displacement, all pumps can be loaded by exactly the same torque in order to distribute the load equally amongst the various pumps.

In the use of the device, the main chamber 44 and the pressure chamber 46 are filled with a fluid through the filling opening 21 in the end wall 20 of the housing 18 of the coupling. After the device is filled with fluid the opening 25 is closed by a screw plug 23.

In the operation of the device, the shafts 12 and 19 may be connected respectively to the power or input shaft and the driven or output shaft of a motor vehicle or other machine. When the power shaft begins to rotate it also causes rotation of the central gear 16. As this gear meshes with one gear 28 of each gear pump 25 the gear pumps also begin to rotate. Owing to the fact that the valves 56, 58, 60 in the circulation ducts 54 between the pressure chambers 46 and the main chamber 44 are closed the rotation of the gears 28, 30 of the gear pumps will cause a pressure to be built up in each pressure chamber 46 of the coupling. This pressure will cause resistance to the rotation of the pump gears 28, 30. Owing to this resistance there will be a torque trying to rotate the housing 18 of the coupling.

When the torque tending to rotate the housing 18 has increased up to a value corresponding to the resistance from the driven shaft against rotation of the housing 18, this housing will begin to rotate in the same direction as the central gear 16. The pressure in the pressure chambers 46 increases up to a value indicative of the torque delivered from the power shaft and when this value is reached the gears of the pumps 25 stop rotating, except for the rotation necessary to compensate for the leakage losses. With the pump gears 28, 30 rotating only to compensate for the leakage losses, the housing 18 rotates in the same direction and at almost the same speed as the central gear 16.

If the torque delivered from the power shaft increases up to and above a value determined by the resultant of the pressure of the valve springs 60 and the centrifugal forces acting upon the valve body 58, the valves will open and the fluid will circulate from the pressure chambers 46 via the ducts 54 to the central chamber 44. When the pressure decreases in the pressure chambers 46, the gear pumps 28, 30 will also begin to rotate so that there will be a difference in the speed of the central gear 16 and the housing 18, i.e., the coupling will slip. When the torque once more decreases beneath said value the valves 56, 58, 60 again close, the gears of the pumps 25 stop rotating and the coupling stops slipping.

When the torque of the power shaft decreases, the pressure in the pressure chambers 46 is at the first moment the same but decreases through leakage down to a new value. During this time, the gears of the pumps 25 do not rotate at all and the decrease in the speed of the central gear 16 does not immediately decrease the speed of the housing 18. During a deceleration period the driven or output shaft for this reason has the same speed as the power or input shaft and comes to a stop at just the same time. The pressure in the pressure chambers 46 decreases then down to the same pressure as in the main chamber 44 so that at a new start exactly the same operation is repeated.

In this way, the coupling is engaged gently, the device is protected against overload and vibrations of the device are damped. Owing to the location of two pump gears 28, 30 of the same or almost the same size at the same or almost the same radial distance from the axis of the coupling both the gears 28, 30 are acted upon by centrifugal forces of almost the same value so that there will be no leakage between the gears on this account. As the pressure chamber 46 of each pump further is located radially outside the gears 28, 30 and has a peripheral length greater than the arc corresponding to the angle between the axes of the pump gears 28, 30 in relation to the axis of the coupling, the pressure in this pressure chamber 46 will act on the pump gears 28, 30 in a direction approximately directly opposed to the direction of the centrifugal forces. Such pressure will for this reason oppose the centrifugal forces so that there will be substantially no leakage between the gears 28, 30 and the walls of the pump chamber 26.

A coupling embodying the invention is for these reasons capable of being used at much higher speeds of the coupling than earlier known types of hydrostatic couplings.

FIG. 4 shows an alternative embodiment of the maximum torque valve, shown in the same kind of view as in FIG. 2. The valve consists in this case of a seat 102 and a valve body 104 seating outwardly, which has a relatively large mass and is provided with lands 106 to be guided in the duct 108. The valve is not provided with any spring.

FIG. 6 shows another alternative embodiment of the maximum torque valve shown in the same kind of view as in FIG. 2. In this case the valve consists of a seat 110 and a valve body 112 seating inwardly, which is forced against its seat by means of a spring 114.

FIG. 8 shows a third alternative embodiment of the maximum torque valve shown in the same kind of view as in FIG. 1 in this case the valve consists of a seat 116 and a valve body 118 movable parallel with the shaft to seat, said body being guided by means of lands 120 in recesses 122 and pressed against the seat by means of a spring 124.

FIGS. 3, 5, 7 and 9 show how the maximum transmissible torque varies with the speed when different types of valves are used.

FIG. 3 is the characteristic of a valve according to the embodiment in FIGS. 1 and 2, in which the spring force and the centrifugal force are cumulative, which provides a certain starting torque and a torque always increasing with the speed.

FIG. 5 is the characteristic of a valve according to the embodiment in FIG. 4 in which the valve body is actuated by the centrifugal force only, giving a starting torque which is very near zero, by a torque always increasing with the speed.

FIG. 7 is the charactertistic of a valve according to the embodiment in FIG. 6, in which the spring force and the centrifugal force oppose each other, which provides a high starting torque with the torque always decreasing with the speed.

FIG. 9 is the characteristic of a valve according to the embodiment in FIG. 8, in which the influence of the centrifugal force is eliminated, and which provides a constant torque irrespective of the speed.

Figure 10:
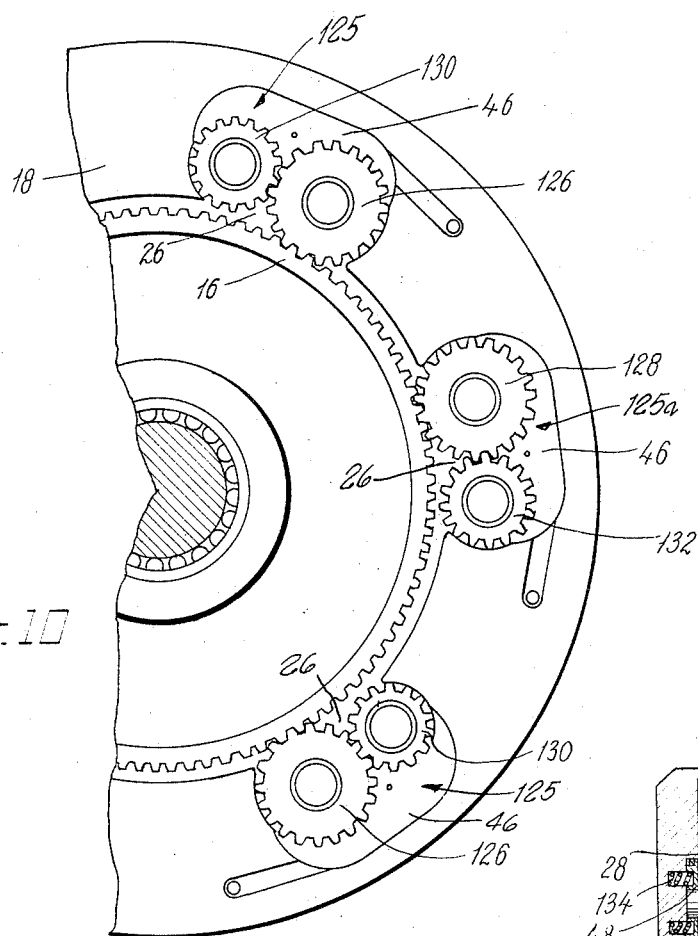
FIG. 10 shows a cross-section through a further embodiment of the invention.

FIG. 10 shows an alternative embodiment of the invention, where the gear 16 is arranged inside the housing 18 filled with fluid. In the housing 18 a number of pump chambers 26 are arranged radially outside the gear 16. In each one of said pump chambers a gear 126 or 128, respectively, is rotationally mounted, which cooperates with the gear 16 and with a second gear 130 or 132, respectively.

The two pairs of pump gears 126, 130 and 128, 132, located in pump chambers 26 and forming pumps 125 and 125a, respectively, are arranged at the same radial distance from the axis 138. The gears 130 and 132 which do not mesh with gear 16 have a radius which is smaller than the radius of the gears 126, 128 by approximately the depth of one tooth.

The gears 130 and 132 further are located on different sides of their respectively cooperating gears 126, 128, whereby one gear pump 125 will supply fluid to its pressure chamber 46 upon one direction of relative rotation between the gears 16 and the housing 18, whereas the other gear pump 125a will supply fluid to its pressure chamber 46 upon an opposite direction of relative rotation between the gears 16 and the housing 18. In this way the coupling may be utilized for drive in either direction.

Figure 11:
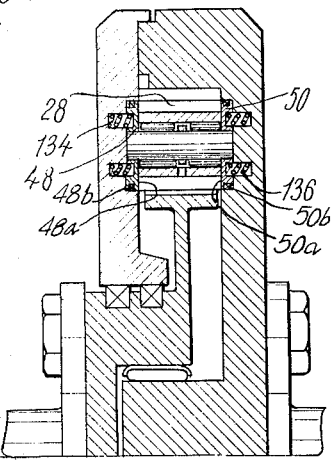
FIG. 11 shows an alternative embodiment of still another detail in FIG. 1.
Figure 90:
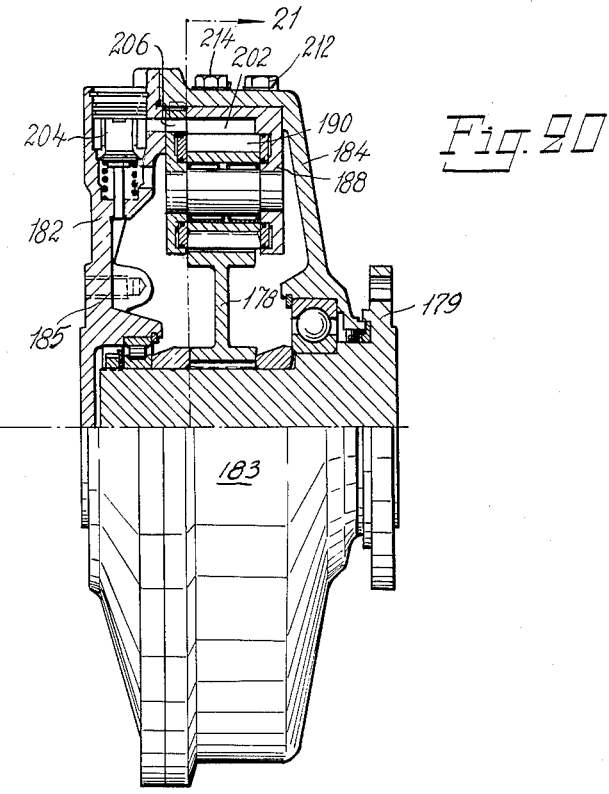
Figure 91:
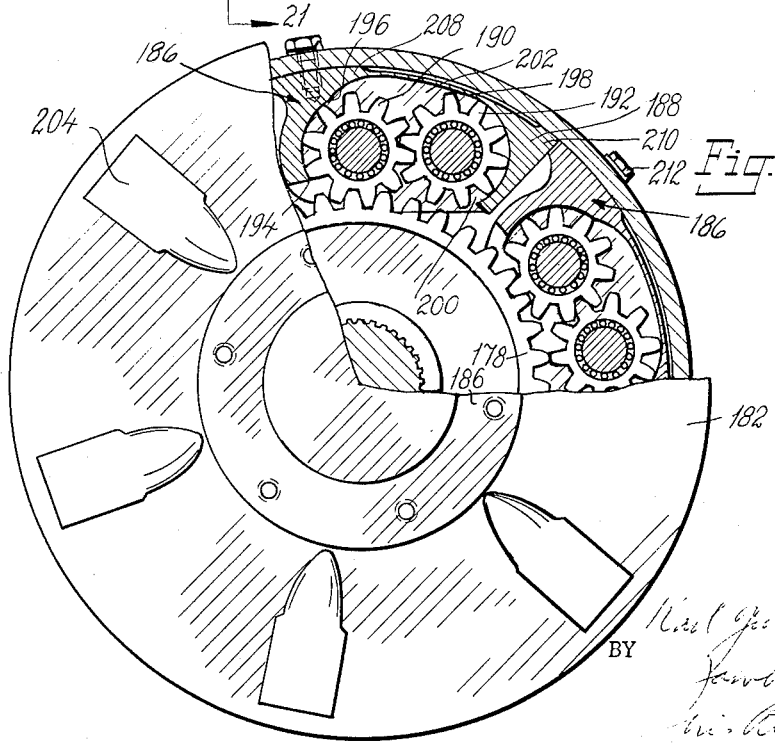

Between each pressure chamber 46 and the main chamber 44 a circulation dust 54 is arranged provided with a valve comprising a radially adjustable valve seat 56, a valve body 58 and a spring 60, pressing the valve body radially outwardly to contact the valve seat in just the same way as shown in FIG. 2. Owing to the fact that the coupling will act in both directions of rotation so that under some circumstances the pumps will pump fluid from the pressure chambers 46 to the main chamber 44, each circulating duct 54 must also provide a non-return valve for flow of fluid only from the main chamber to the pump chamber. This non-return valve may be of any earlier known type giving a small resistance to the fluid flow. In order to get a good sealing of the pumps they are also provided with sealing plates 48, 50 as shown in FIGS. 1 and 11. This is also shown in FIG. 10 by the channels 52.

FIG. 11 shows an embodiment, in which the axial sealing plates 48, 50 are pressed against the gears 28, 30 by means of springs 134, 136 instead of by pressure liquid.

FIGS. 12 and 13 show a specific type of pressure plate sealing comprising two generally circular plates 62 and 64 meeting along a line 65 perpendicular to the line connecting the centres of the shafts 36, 38 of the respective pump gears 28, 30. These plates 62 and 64 are enclosed in a recess 66 of one axial wall of the pump chamber. The shape of this recess is such that the peripheral walls of it are in sealing proximity to the peripheral walls of the plates 62, 64. Each plate 62, 64 is provided with a channel 68 connecting the gear faces 62a and 64a with the motive faces 62b and 64b, respectively, of the plates, so situated in relation to the pump chamber 26 and the pump gears 28, 30 that each channel at the gear face of the plate communicates with the pressure chamber 46. In this way the high pressure of the pressure chamber 46 is conducted to the motive faces 62b and 64b of the plates. The plates 62, 64 are thus forced into sealing proximity with the sides of the pump gears 28, 30. In order to increase the force with which the plates 62, 64 are pressed against the gear a wave spring 70 is located between the bottom of the recess 66 and the motive side of each plate facing the bottom. The peripheral walls of the end plates are provided with annular grooves in which O-rings 72, 74 are located for increasing the sealing effect.

FIGS. 14 and 15 show another embodiment of pressure fluid construction in which two pressure plates 76 and 78 are employed, which are generally circular and meet along a line normal to a line drawn through the axes of the gears. Since these plates are alike, only one plate 78 need be described. This plate is provided with an axial projection 82 eccentric with respect to the axis of the gear and received in a blind bore 84 in the bottom of the recess 86, sealing against the peripheral wall of said bore. The projection 82 is so located in relation to the axis of the gear 28 and the pressure chamber 46 of the pump that the center of the part of the pressure plate forming the projection 82 is situated on the side of the gear axis opposite to that on which the pressure chamber 46 is situated. The plate 78 is provided with two channels, one channel 88 connecting the motive face 82b of the projection 82 with the gear face 78a of the plate and another channel 90 connecting the annular motive face 78b surrounding the projection 82 with the gear face 78a. These channels 88 and 90 are so situated that bore 84 is in communication with the main chamber 44 so that the low pressure is conducted to this bore and the annular chamber formed in the recess 86 and limited by the motive face 78b of the plate and the periphery of the projection 82 is connected with the pressure chamber 46 so that the high pressure is conducted to this annular chamber. Owing to the fact that the pressure acting on the gear side of the plate is different from one point to another as there is a high pressure on one radial side of the gear and a low pressure on the other, the pressure will give the pressure plate 78 a tilting movement. This tilting movement is counteracted by the asymmetric pressure on the motive side of the plate due to the eccentric location of the projection 82. The sealing effect along the periphery of the pressure plate is increased by O-rings 92, 94 and 96 in the same manner as in FIG. 12.

FIGS. 16 and 17 show still another embodiment, similar to that of FIGS. 14 and 15. Again the description of one pressure plate will suffice. The difference between these two embodiments is that the center of the eccentric projection 140 of the end plate 144 in FIGS. 16 and 17 is situated on the same side of the axis of the gear 30 as the high pressure chamber and that the chamber between the bottom of the blind bore 146 and the motive face of the eccentric projection 140 is connected with the pressure chamber 46 through the channel 148 and the annular chamber between the bottom of the recess 150 and the annular motive face of the end plate surrounding the projection 140 is connected with the main chamber through the channel 152. In this case also the torque acting on the motive face of the plate will balance tilting movement of the plate due to the non-uniform fluid pressure on the gear face of the plate. The sealing effect along the periphery of the plate is increased by O-rings 154, 156 and 158.

FIGS. 18 and 19 show an embodiment similar to that of FIGS. 16 and 17, which again may be described in terms of the construction of one of the pressure plates. The difference between those embodiments is that the eccentric projection is replaced by an eccentric annular groove 160 in the surface of the pressure plate 162, facing the bottom of the recess 166 and by a yielding ring 168 located in said groove and sealing against the bottom of the groove as well as against the bottom of the recess. The chamber between the bottom of the recess 166 and the plate 162 is in this way divided into two portions of which the portion inside the yielding ring 168 is connected with the pressure chamber 46 through a channel 170 and the portion outside the yielding ring is connected with the main chamber 44 through a channel 172. The sealing effect along the jacket surfaces of the end plate 162 is increased by O-rings 174 and 176.

FIGS. 20 and 21 show an embodiment of a coupling according to the invention which is built up by a central gear 178 connectable with one shaft by a flange 179, a coupling housing indicated generally at 183 comprising two parts 182 and 184 and connectable with another shaft at 185, and a number of pump units indicated generally at 186. Each of these units comprises a casing 188 fixed to the housing 183. This casing encloses a pump chamber in which two intermeshing pump gears 190, 192 are located. The pump gear 190 is in mesh with the central gear 178. The pump chamber has a peripheral wall comprising two peripherally spaced sealing sections 194–196 and 198–200 in effective sealing proximity to the peripheries of the respective gears 190, 192 and an intermediate section 196–198 connecting the sealing sections. The intermediate section 196–198 is spaced radially from the peripheries of the pump gears 190, 192 sufficiently to provide a pressure chamber 202. This pressure chamber is connected with a non-return valve 204 located in the housing part 182 through a channel 206. Each gear pump casing 188 is provided with two locating shoulders 208, 210 which are spaced peripherally and rest against the peripheral wall of the housing part 184. Each casing 188 is fixed to the housing 184 by a rigid joint comprising two screws 212, 214 lying in the same axial plane so that there is no possibility of transmitting any stress from the housing to the casing as the other end of the casing is only resting against the peripheral wall of the housing but not fixed against peripheral movement relative to the housing.

The number of the teeth of the central gear is chosen in such a way that double this number is an odd multiple of the number of the gear pumps. As a matter of fact the pressure delivered from a gear pump is not absolutely the same from moment to moment but varies with the angular position of the teeth. The variation of the pressure substantially follows a sine curve. It is from the point of vibration damping advantageous that the sum of the torques transmissible through the coupling by the individual pumps is as constant as possible. For that reason the number of the teeth of the central gear ought to be chosen in such a way that it is different from any multiple of the number of the gear pumps so that the timing of the meshing of the central gear with the gears of the several pumps differs from one pump to the other and thus the peaks of the variation of the total torque transmitted by the coupling are cut away.

I claim:

1. A hydrostatic coupling comprising a rotatably mounted toothed central gear, a rotatably mounted housing coaxial with said gear and providing a main chamber for working fluid, a plurality of gear pumps carried by said housing in peripherally spaced relation to rotate therewith, each of said pumps comprising a pump chamber having a pair of toothed pump gears mounted to rotate about their own axes therein in peripherally disposed intermeshing relation, with one of the gears of each pair driven from said central gear, the peripheral wall of each of said pump chambers comprising two peripherally spaced sealing sections in effective sealing proximity to the peripheries of the respective gears of the pump and an intermediate section connecting said sealing sections, said intermediate section being spaced radially outwardly from the peripheries of said pump gears sufficiently to provide a pressure chamber located radially outwardly of the pump gears for exerting radially inwardly directed force thereon due to the pressure of fluid on the delivery side of the pump, said pressure chamber extending peripherally over an angle at least as great as that included between two radii extending from the axis of rotation of the housing and passing through the respective axes of rotation of the pump gears.

2. A hydrostatic coupling as defined in claim 1, in which the peripheral extent of the pressure chamber between the effective sealing sections of each pump is substantially coextensive with the peripheral extent of the pump.

3. A hydrostatic coupling comprising a rotatably mounted central gear, a rotatably mounted housing coaxial with said gear and providing a main chamber for working fluid, a plurality of gear pumps carried by said housing in peripherally spaced relation to rotate therewith, each of said pumps comprising a pump chamber having a pair of pump gears mounted to rotate about their own axes therein in intermeshing relation with one of the gears of each pair driven from said central gear, a pressure chamber for each of said pumps, the peripheral wall of each of said pump chambers comprising two peripherally spaced sealing sections in effective sealing proximity to the peripheries of the respective gears of the pump and an intermediate section connecting said sealing sections, said intermediate section being spaced radially from the peripheries of said pump gears sufficiently to provide a circulation duct connecting the pressure chamber of each of said pumps to said main chamber, and means for limiting the maximum torque transmitting capacity of said coupling comprising a loaded non-return valve in each of said ducts for permitting flow of fluid therethrough only from the pressure chamber to the main chamber, the torque transmitting capacity of the coupling being determined by the fluid pressure required to effect opening of the loaded valves.

4. A hydrostatic coupling comprising a rotatably mounted toothed central gear, a rotatably mounted housing coaxial with said gear and providing a main chamber for working fluid, a plurality of gear pumps carried by said housing in peripherally spaced relation to rotate therewith, each of said pumps comprising a pump chamber having a pair of toothed pump gears mounted to rotate about their own axes therein in intermeshing relation with one of the gears of each pair driven from said central gear, the peripheral wall of each of said pump chambers comprising two peripherally spaced sealing sections in effective sealing proximity to the peripheries of the respective gears of the pump and an intermediate section connecting said sealing sections, said intermediate section being spaced radially from the peripheries of said pump gears sufficiently to provide a pressure chamber, the number of the teeth of the central gear being different from any multiple of the number of the gear pumps.

5. A hydrostatic coupling as defined in claim 4, in which double the number of the teeth of the central gear is coincident with an odd multiple of the number of the gear pumps.

6. In a hydrostatic coupling comprising a housing providing a main chamber for working fluid and a central gear coaxial with and relatively rotatable with respect to said housing, a plurality of gear pump units carried in peripherally spaced relation by said housing, each of said units comprising a separate pump casing providing a pump chamber having an inlet opening and a pressure chamber and a pair of intermeshing pump gears rotatably mounted in said casing, each of said pump casings being secured by a rigid connection to said housing in a position with said inlet in communication with said main chamber and one of said pair of gears meshing with said central gear, said rigid connection being confined to a localized zone permitting freedom of relative movement of said unit with respect to said housing except at said localized zone of connection, whereby to maintain said units free from stress and distortion resulting from dimensional change and distortion of said main housing.

7. A hydrostatic coupling comprising a rotatably mounted toothed central gear, a rotatably mounted housing coaxial with said gear and providing a main chamber for working fluid, a plurality of gear pumps carried by said housing in peripherally spaced relation to rotate therewith, each of said pumps comprising a pump chamber and a pair of toothed pump gears mounted to rotate about their own axes in said chambers in intermeshing relation, with one of the gears of each pair driven from said central gear, the peripheral wall of each of said pump chambers comprising two peripherally spaced sealing sections in effective sealing proximity to the peripheries of the respective gears of the pump and an intermediate section connecting said sealing sections, said intermediate section being spaced radially from the peripheries of said pump gears sufficiently to provide a pressure chamber, certain of said pump gears being disposed to cause the pump formed thereby to deliver liquid to the pressure chamber of the pump upon relative rotation between said central gear and said housing in a first direction and certain other of said pump gears being disposed to cause the pump formed by said other gears to deliver liquid to the pressure chamber of the last named pump upon relative rotation between said central gear and said housing in a direction opposite to said first direction.

8. A coupling as defined in claim 7 in which alternate ones of said peripherally spaced pumps comprise pairs of gears in which the pump gears meshing with the central gear are located on the same side peripherally with respect to their respectively mating pump gears and the remaining pumps comprise pairs of gears in which the pump gears meshing with the central gear are located on the opposite side peripherally with respect to their respectively mating pump gears.

9. In a hydrostatic coupling of the kind having a central gear and a plurality of gear pumps each comprising a pair of intermeshing pump gears one of which is in mesh with said central gear, that improvement which is characterized by said central gear being provided with a number of teeth different from any multiple of the number of pump gears meshing therewith.

10. A coupling as defined in claim 9 in which double the number of the teeth of said central gear coincides with an odd multiple of the number of pumps.

11. A hydrostatic coupling comprising a rotatably mounted central gear, a rotatably mounted housing coaxial with said gear and providing a main chamber for working fluid, a plurality of gear pumps carried by said housing in peripherally spaced relation to rotate therewith, each of said pumps comprising a pump chamber, a pair of intermeshing pump gears in said chamber, bearings for mounting said gears to rotate about their own axes in said chamber with one of said pump gears intermeshing with said central gear, each of said pump chambers having a peripheral wall comprising two peripherally spaced sealing sections in effective sealing proximity to the peripheries of the respective gears of the pump and an intermediate section connecting said sealing sections, said intermediate section being spaced radially from the peripheries of said pump gears sufficiently to provide a pressure chamber and each of said pump chambers further having at least one end wall comprising two separate pressure plates mounted to move independently of said bearings into pressure engagement with the confronting surfaces of said pump gears to provide surfaces in effective sealing relation therewith.

12. A coupling as defined in claim 11 in which each of said pump chambers is recessed at least at one end to receive said two separate pressure plates with the peripheries of the plates in effective sealing proximity to the peripheral walls of the recess and to each other and the recess being in pressure communication with the pressure chamber of the pump.

13. A coupling as defined in claim 12 in which pressure springs are provided in the recess behind the pressure plates for biasing the plates into pressure contact with the confronting faces of the pump gears.

14. A coupling as defined in claim 11 in which shafts fixedly mounted in the walls of the pump chambers carry said bearings, said pressure plates being free to move axially relative to said shafts.

15. A coupling as defined in claim 14 in which said bearings comprise needle bearings.

16. A coupling as defined in claim 15 in which said shafts and the bores in the pump gears provide the bearing surfaces for the needle rollers of said needle bearings.

17. A coupling as defined in claim 12 in which said recesses are relatively very shallow axially as compared with the diameters of said pump gears and said pressure plates are relatively very thin as compared with said diameters.

18. A coupling as defined in claim 12 in which each pressure plate is provided with an axial extension on the face of the plate remote from the confronting pump gear, said extension being eccentric to the periphery of the plate and in sealing proximity to the peripheral wall of said recess, said recess being provided with blind bores each having a peripheral wall in effective sealing proximity to the periphery of one of said projections, said recess being in pressure communication with only one of the aforesaid main and pressure chambers and each of said bores being in pressure communication with the other of said chambers.

19. A coupling as defined in claim 18, in which said recess is in pressure communication with said pressure chamber and each of said bores is in pressure communication with said main chamber.

20. A hydrostatic coupling as defined in claim 12 including packing rings located in said recess between the surface of each of said pressure plates remote from the confronting pump gear and a confronting wall surface of said recess, an annular groove in one of the two last mentioned surfaces for guiding each of said rings, said grooves being eccentric to the periphery of the cooperating pressure plate, the part of the recess outside said packing rings being in pressure communication with only one of the aforesaid main end pressure chambers and the parts of the recess inside the packing rings being in pressure communication with the other one of said chambers.

21. A coupling as defined in claim 6 in which said localized zone is confined substantially to the immediate region of a plane extending axially of said housing.

22. A coupling as defined in claim 6, in which each of said casings is provided with two peripherally spaced shoulders engaging a wall portion of said housing, one of said shoulders being fixed at said localized zone and the other of said shoulders being free to move peripherally relative to the cooperating portion of the wall of the housing.

23. A coupling as defined in claim 3, in which said non-return valves are spring loaded.

24. A coupling as defined in claim 23, in which the springs providing the loads for the individual valves are separately adjustable.

25. A coupling as defined in claim 3, in which the valve bodies of the non-return valves are arranged to move radially outwardly to seat.

26. A coupling as defined in claim 3, in which the valve bodies of the non-return valves are arranged to move radially inwardly to seat.

27. A coupling as defined in claim 3, in which the valve bodies of the non-return valves are arranged to move parallel with the shaft of the coupling to seat.

References Cited in the file of this patent

UNITED STATES PATENTS

| | | | |
|---|---|---|---|
| 1,223,734 | 4/1917 | Rinehart | 192—61 X |
| 1,289,520 | 12/1918 | Nettenstrom | 192—61 |
| 1,510,123 | 9/1924 | Wemp | 192—110 X |
| 1,568,394 | 1/1926 | Arkin | 192—60 |
| 2,399,008 | 4/1946 | Doran | 103—126 |
| 2,484,015 | 10/1949 | Cochran | 192—61 |
| 2,727,607 | 12/1955 | Colmerauer | 192—61 |
| 2,824,522 | 2/1958 | Compton | 103—126 |

DAVID J. WILLIAMOWSKY, *Primary Examiner.*

THOMAS J. HICKEY, ROBERT C. RIORDON,
*Examiners.*

H. D. COOPER, F. R. HANDREN, A. T. McKEON,
*Assistant Examiners.*